United States Patent
Humphrey et al.

(10) Patent No.: US 11,726,972 B2
(45) Date of Patent: Aug. 15, 2023

(54) DIRECTED DATA INDEXING BASED ON CONCEPTUAL RELEVANCE

(71) Applicant: EntIT Software LLC, Sunnyvale, CA (US)

(72) Inventors: David Humphrey, Cambridge (GB); Samuel James Jeffrey, Cambridge (GB); Phillip Greenwood, Cambridge (GB)

(73) Assignee: Micro Focus LLC, Santa Clara, CA (US)

( * ) Notice: Subject to any disclaimer, the term of this patent is extended or adjusted under 35 U.S.C. 154(b) by 1249 days.

(21) Appl. No.: 15/939,902

(22) Filed: Mar. 29, 2018

(65) Prior Publication Data

US 2019/0303464 A1    Oct. 3, 2019

(51) Int. Cl.
    *G06F 16/22*      (2019.01)
    *G06F 16/245*     (2019.01)
    *G06F 16/248*     (2019.01)
    *G06F 16/9535*    (2019.01)
    *G06F 16/955*     (2019.01)

(52) U.S. Cl.
    CPC ........ *G06F 16/2228* (2019.01); *G06F 16/245* (2019.01); *G06F 16/248* (2019.01); *G06F 16/9535* (2019.01); *G06F 16/9566* (2019.01)

(58) Field of Classification Search
    CPC .................................................. G06F 16/2228
    See application file for complete search history.

(56) References Cited

U.S. PATENT DOCUMENTS

| | | | |
|---|---|---|---|
| 7,904,445 B2 | 3/2011 | Adelman et al. | |
| 9,245,243 B2 | 1/2016 | Mohan | |
| 9,501,566 B1 | 11/2016 | Wiggins | |
| 2003/0088397 A1* | 5/2003 | Karas | G06F 16/685 704/E15.045 |
| 2010/0250586 A1* | 9/2010 | Hall | G06F 16/951 707/769 |
| 2012/0066210 A1 | 3/2012 | Mukerjee et al. | |
| 2014/0059035 A1 | 2/2014 | Williams et al. | |
| 2017/0103337 A1 | 4/2017 | Cao et al. | |

OTHER PUBLICATIONS

Graupmann et al, "Compass: A Concept-based Web Search Engine for HTML, XML, and Deep Web Data," 2004, pp. 1313-1316, Toronto, Canada.

Search Engine, IBM Knowledge Center—Search Engine, https://www.ibm.com/support/knowledgecenter/SS8NLW_9.0.0/com.ibm.swg.im.infosphere.dataexpl.engine.doc/c_vse.html.

* cited by examiner

*Primary Examiner* — Van H Oberly
(74) *Attorney, Agent, or Firm* — Sheridan Ross P.C.

(57) ABSTRACT

A non-transitory machine-readable storage medium stores instructions that upon execution cause a processor to, in response to initiation of a data indexing for a search concept, retrieve content of a first data source via a data connector, the retrieved content including a reference to a second data source. The instructions further cause the processor to, in response to a determination that the retrieved content of the first data source is relevant to the search concept: index the retrieved content of the first data source; retrieve content of the second data source based on the reference; and determine whether the retrieved content of the second data source is relevant to the search concept.

20 Claims, 10 Drawing Sheets

DIRECTED DATA INDEXING BASED ON CONCEPTUAL RELEVANCE

BACKGROUND

Some computer systems collect data in databases. The collected data may include text documents, audio files, webpages, images, video files, and so forth. The collected data may be stored and retrieved using a computer program such as a database management system (DBMS). One type of database is a relational database, which stores information in tables.

BRIEF DESCRIPTION OF THE DRAWINGS

Some implementations are described with respect to the following figures.

DETAILED DESCRIPTION

Some computer systems may provide data collection and searching functionality. Further, some computer systems may determine the conceptual content of the collected data. For example, a system may collect data from any number of internal and/or external data sources, and may perform an analysis to determine one or more concepts that are associated with the collected data. Such collected data may be indexed to to allow users to search and retrieve required information. In some examples, to provide a valid index, it may be necessary to collect and analyze a large amount of data from numerous data sources. Thus, in such examples, the data collection may consume large amounts of bandwidth, time, and storage capacity. Further, in some examples, the location(s) of the most useful data may not be known before the data collection and analysis is performed. As such, the data collection process may not capture the most relevant data for generating an index.

In accordance with some implementations, examples are provided for directed collection and indexing of data based on conceptual relevance. As described further below with reference to FIGS. 1-6, some implementations may include a data connector that collects data from a first data source. In some examples, the collected data may include a reference to a second data source. The collected data may be analyzed to determine its relevance to a specific concept. If the collected data is determined to not be relevant to the concept, the data connector may discard the collected data, and will not access the second data source based on the reference. However, if the collected data is determined to be relevant to the concept, the data connector may index the collected data, and may use the reference to retrieve data from the second data source. This process may then be repeated for any number of data sources. In this manner, the collection and indexing of data may be dynamically directed based on the conceptual relevance of the collected data. Accordingly, some examples may reduce bandwidth, time, and/or storage requirements to establish the data repository. Further, some examples may improve the relevance and/or usefulness of the data indexed for conceptual searches.

Figure 1:
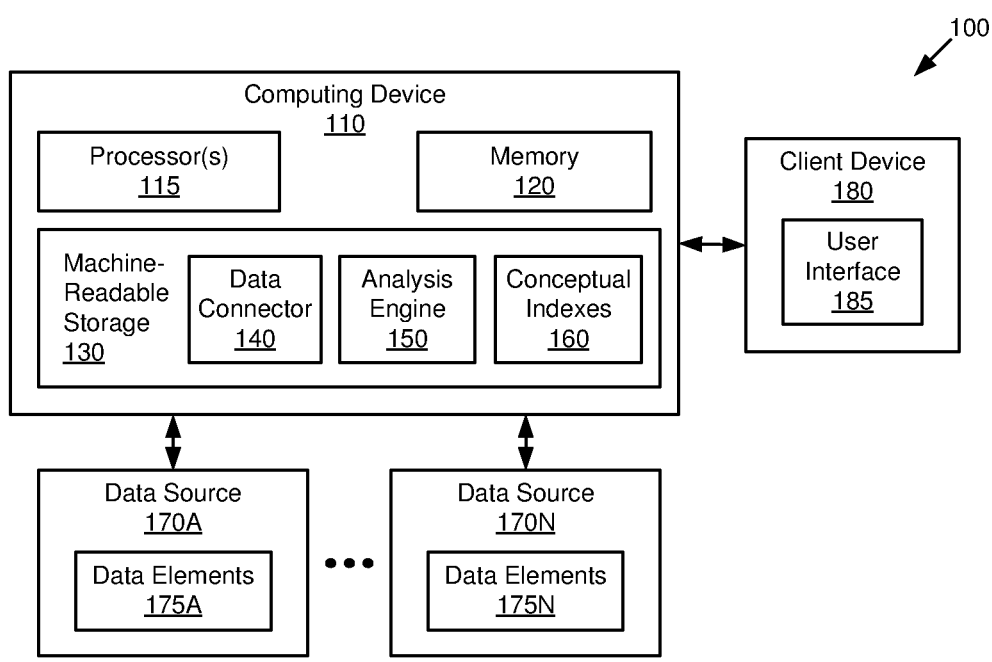
FIG. 1 is a schematic diagram of an example system, in accordance with some implementations.

Referring now to FIG. 1, shown a schematic diagram of an example system 100, in accordance with some implementations. As shown, in some implementations, the system 100 may include a computing device 110 connected via a network to any number of data sources 170A-170N (also referred to collectively as data sources 170) that include respective data elements 175A-175N (also referred to collectively as data elements 175). Further, in some implementations, the system 100 may include a client device 180 that includes a user interface 185.

In one or more implementations, the computing device 110 may include processor(s) 115, memory 120, and machine-readable storage 130. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.). In some implementations, the machine-readable storage 130 can include non-transitory storage media such as hard drives, flash storage, optical disks, etc.

In one or more implementations, the machine-readable storage 130 can include a data connector 140, an analysis engine 150, and conceptual indexes 160. In one or more implementations, the data connector 140 and/or the analysis engine 150 may be implemented in machine-readable instructions (e.g., software and/or firmware) that are executable by the processor(s) 115. The machine-readable storage 130 may be a non-transitory computer readable medium, such as an optical, semiconductor, or magnetic storage device.

In one or more implementations, the data connector 140 is an application and/or interface executable to establish connections to the data sources 170. For example, a data source 170 may be a particular website, network domain, database, relational table, document, flat file, storage device, data repository, storage array, software application, web service, social network, user account, HyperText Mark-up Language (HTML) page, Extensible Markup Language (XML) file, and so forth. In some implementations, the data connector 140 may be executable to retrieve specific data elements 175 from the data sources 170 via the established connections. For example, the data sources 170 may include any number of Internet websites, and the data connector 140 may perform a web crawl to retrieve data from such websites.

In one or more implementations, the analysis engine 150 may be an application executable to determine whether a specific data element 175 is relevant to a particular concept. For example, the analysis engine 150 may calculate a metric value indicating the relevance of the data element 175 to the concept (e.g., a similarity measure, an importance measure, and so forth). Further, the analysis engine 150 may determine that the data element 175 is relevant to the concept if the metric value exceeds a defined threshold. An example implementation of the analysis engine 150 is described below with reference to FIG. 7.

In one or more implementations, the analysis engine 150 may provide a signal or indication to notify the data connector 140 that a data element 175 is relevant to a particular concept. Upon notification that the data element 175 is relevant to the concept, the data connector 140 may generate and/or update a particular conceptual index 160 based on the content of the data element 175. In some implementations, each conceptual index 160 may be a data structure that facilitates rapid identification and retrieval of collected data (i.e., the content of the data elements 175) that is associated with a given concept. For example, a conceptual index 160 may include one or more of a suffix tree index, an inverted index, a citation index, an N-gram index, a document-term matrix, a hash table, and so forth. Further, in some implementations, a conceptual index 160 may include some or all of the content of the collected data. An example implementation of the conceptual index 160 is described below with reference to FIG. 2.

In one or more implementations, a data element 175 in a data source 170 may include a reference (not shown in FIG. 1) to a different data source 170. As used herein, a "reference to a data source" is data that identifies a particular data source 170. For example, a reference to data source 170A may be a hyperlink, a domain name, a network address, a unique identifier, a text string or description (e.g., "DS-170A," "the first drive," "the corporate website,"), a numerical value (e.g., "170.1"), an audio sample (e.g., human speech identifying a data source), a still image, a defined symbol (e.g., a logo, stock symbol, etc.), a uniform resource locator (URL), video content (e.g., a video image of a data source location), a social network posting, a comment, and so forth. In some implementations, if the data element 175 is relevant to a concept, the data connector 140 may use a reference in the data element 175 to access a different data source 170. The use of references to access data sources is discussed in further detail below with regard to FIGS. 3A-3D.

Figure 2:
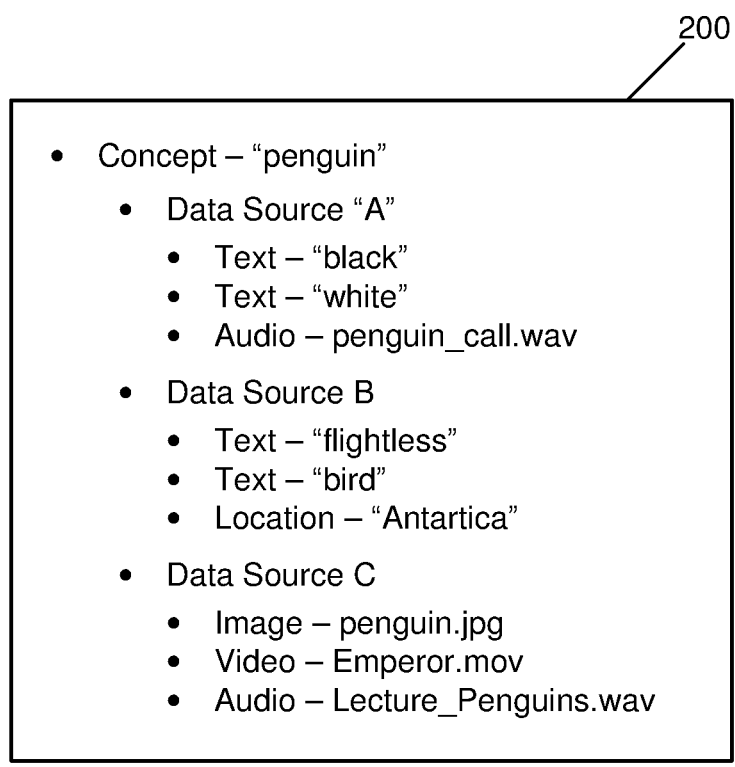
FIG. 2 is an illustration of an example conceptual index in accordance with some implementations.

Referring now to FIG. 2, shown is an illustration of an example conceptual index 200 in accordance with some implementations. The conceptual index 200 may correspond generally to an example implementation of the conceptual indexes 160 shown in FIG. 1. Assume that, in the example of FIG. 2, the conceptual index 200 is associated with the concept "penguin," and includes information associated with three data sources "A," "B," and "C." For example, the conceptual index 200 indicates that data source "A" includes text and audio information associated with penguins (i.e., text labels "black" and "white," and an audio sample of a penguin call). In some implementations, the conceptual index 200 may be used to perform conceptual searches (e.g., via the user interface 185 of client device 180). Note that the conceptual index 200 shown in FIG. 2 is a non-limiting example, and other implementations are possible.

Referring now to FIGS. 3A-3D, shown are example data collection and indexing operations 300-303 in accordance with some implementations. Assume that the operations 300-303 correspond generally to an example sequence of operations performed at various points in time to generate a concept index based on data collected from one or more data sources. Assume further that the operations 300-303 are performed in response to detecting a requirement to index data associated with a specified concept (e.g., "penguins," "solar power," "democracy," and so forth). In some examples, the operations 300-303 may be implemented with the system 100 shown in FIG. 1. However, other implementations are also possible.

Figure 3A:
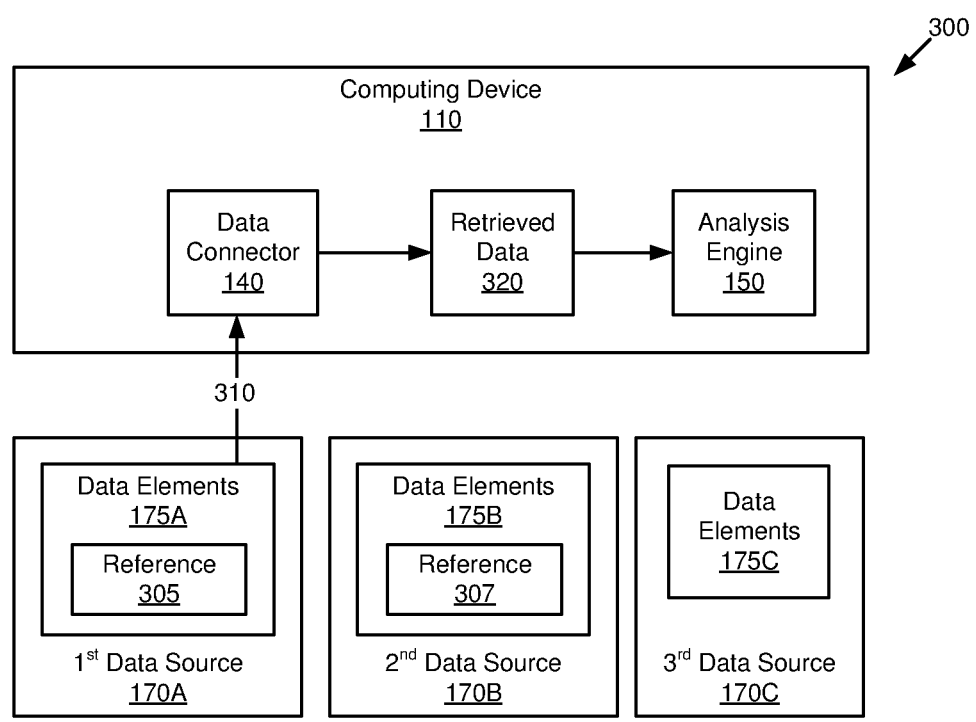
FIGS. 3A-3D show diagrams of example data collection and indexing operations, in accordance with some implementations.

Referring now to FIG. 3A, a first operation 300 includes the data connector 140 establishing a connection 310 to the first data source 170A and obtaining the retrieved data 320 (corresponding to all or a portion of the data elements 175A). Assume that, in the example of FIG. 3A, the data elements 175A include a reference 305 to the second data source 170B.

Figure 3B:
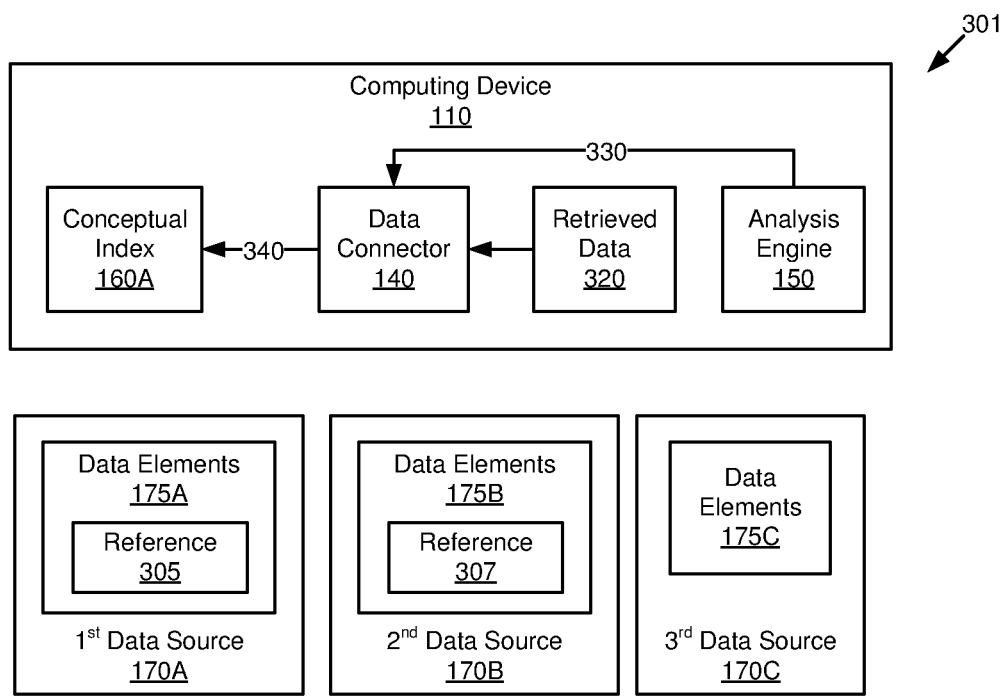

Referring now to FIG. 3B, assume that the analysis engine 150 analyzes the retrieved data 320, and thereby determines that the retrieved data 320 is relevant to the specified concept. Accordingly, the second operation 301 shown in FIG. 3B includes the analysis engine 150 providing a signal 330 to the data connector 140 to indicate that the retrieved data 320 is relevant to the specified concept. In response to the signal 330, the data connector 140 uses the retrieved data 320 to generate 340 the conceptual index 160A.

Figure 3C:
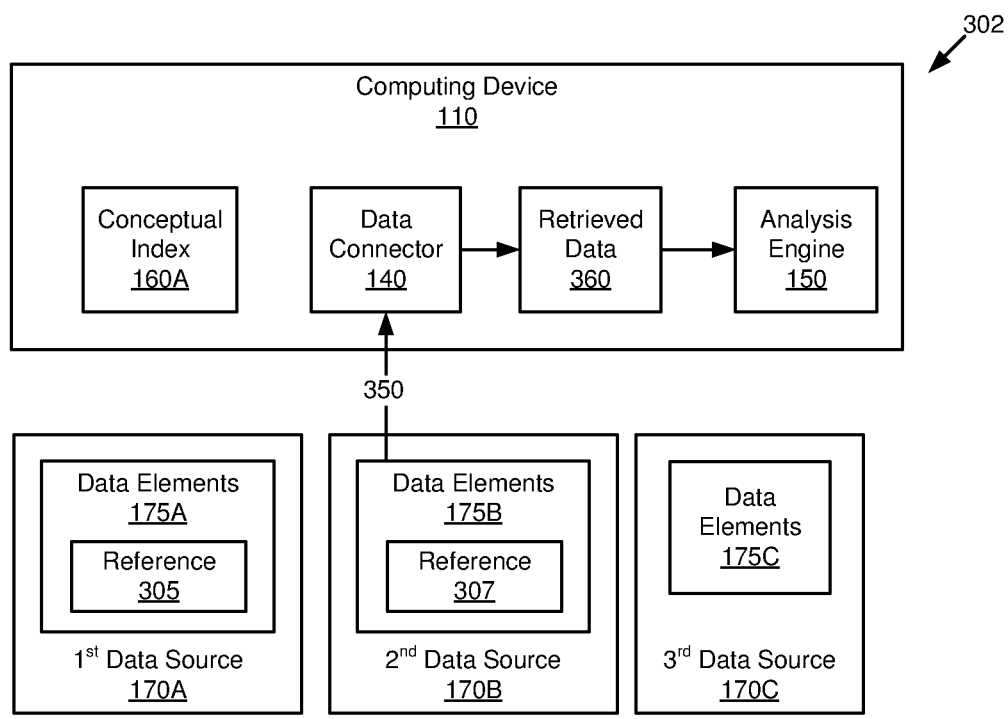

Referring now to FIG. 3C, a third operation 302 includes the data connector 140 establishing a connection 350 to the second data source 170B and obtaining the retrieved data 360 (corresponding to all or a portion of the data elements 175B). Assume that the data elements 175B include a reference 307 to the third data source 170C.

Figure 3D:
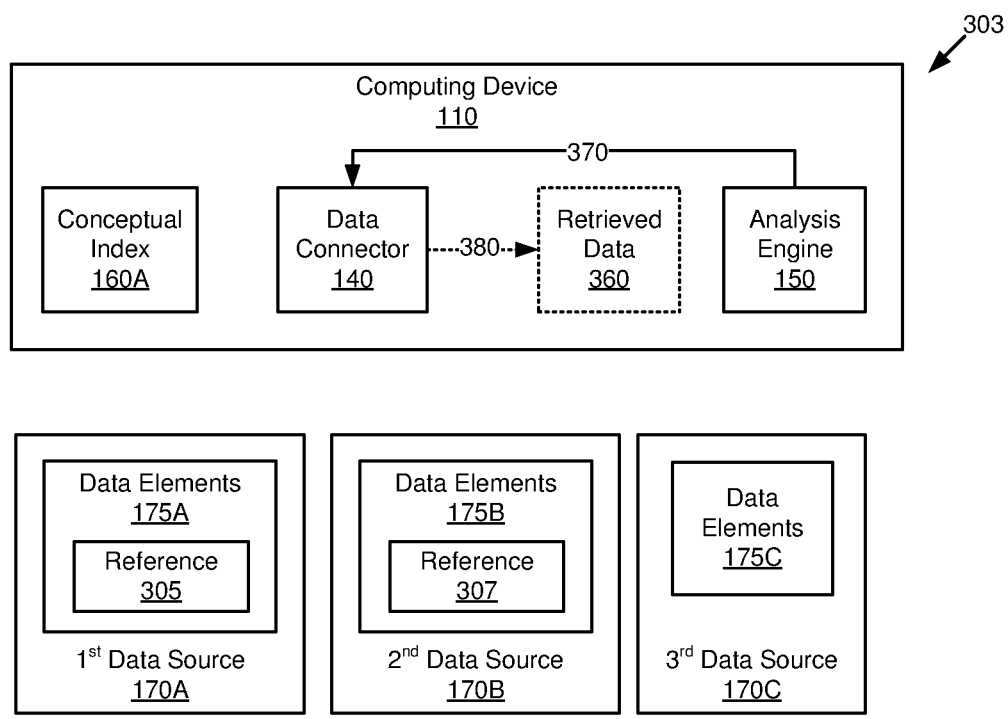

Referring now to FIG. 3D, assume that the analysis engine 150 analyzes the retrieved data 360, and thereby determines that the retrieved data 360 is not relevant to the specified concept. Accordingly, the fourth operation 303 shown in FIG. 3D includes the analysis engine 150 providing a signal 370 to the data connector 140 to indicate that the retrieved data 360 is not relevant to the specified concept. In response to the signal 370, the data connector 140 deletes 380 the retrieved data 360. Note that, because the retrieved data 360 is not relevant, the data connector 140 does not use the retrieved data 360 to update the conceptual index 160A. Further, because the retrieved data 360 is not relevant, the data connector 140 does not access the third data source 170C indicated by the reference 307 in data elements 175B. In some examples, the data connector 140 may then continue to retrieve data from a fourth data source (not shown in FIGS. 3A-3D) that is not referenced in the first and second data sources 175A, 175B. The analysis engine 150 may then analyze the data of the fourth data source to determine whether it is relevant to the specified concept. In such a manner, the process illustrated by the example operations 300-303 of FIGS. 3A-3D may be repeated for any number of data sources 170. Accordingly, the collection and indexing of data may be dynamically directed based on the conceptual relevance of the collected data.

Figure 4:
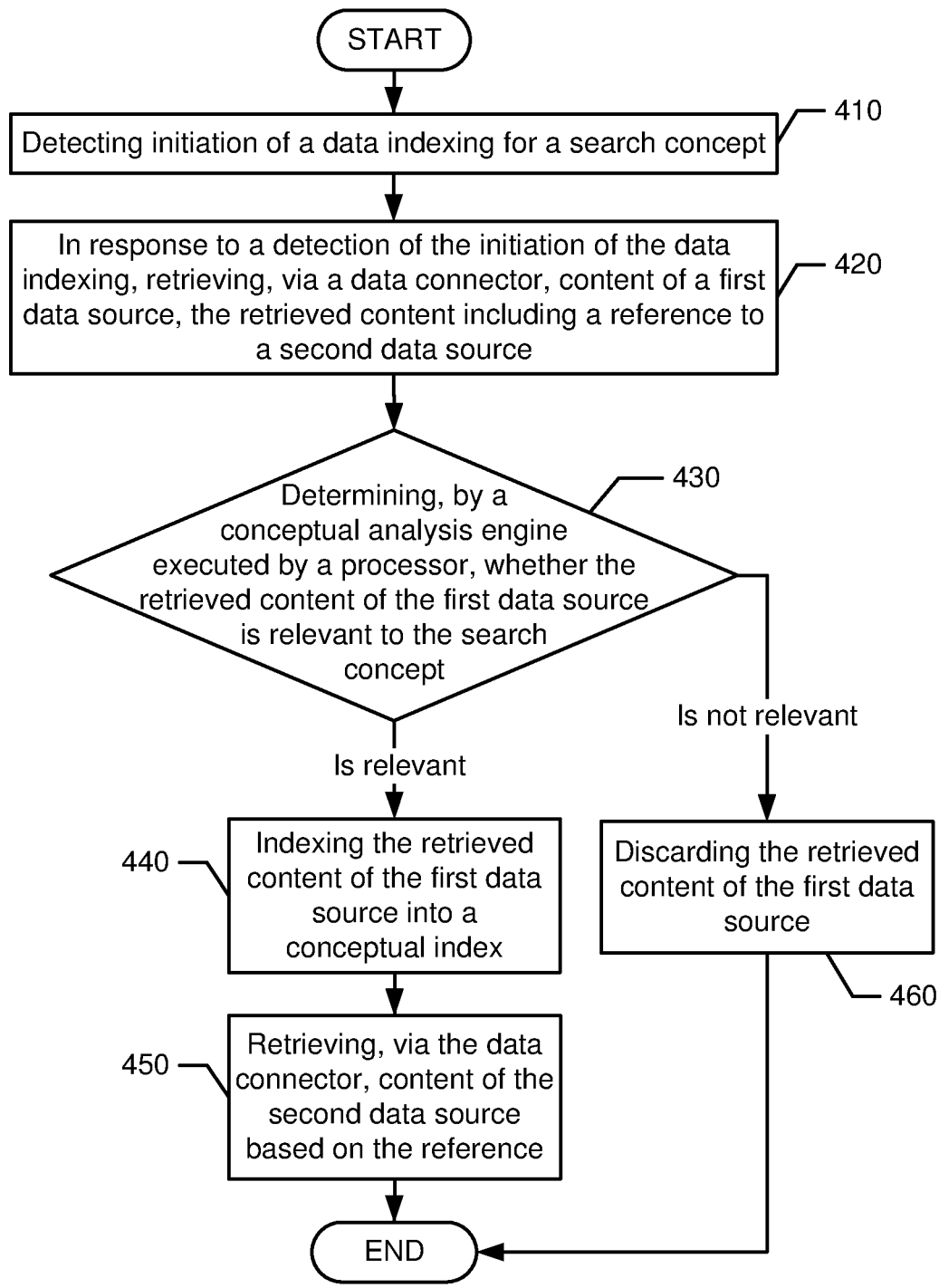
FIG. 4 is a flow diagram of an example process, in accordance with some implementations.

Referring now to FIG. 4, shown is an example process 400, in accordance with some implementations. In some examples, the process 400 may be performed by some or all of the system 100 shown in FIG. 1. The process 400 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-3D, which show examples in accordance with some implementations. However, other implementations are also possible.

Block 410 may include detecting initiation of a data indexing for a search concept. For example, referring to FIG. 1, the graphical user interface 185 may receive a user command or signal to initiate generation of a conceptual index associated with a particular concept. In some examples, generating the conceptual index may include performing a web crawl to retrieve data from various websites.

Block 420 may include, in response to a detection of the initiation of the data indexing, retrieving, via a data connector, content of a first data source, the retrieved content including a reference to a second data source. For example, referring to FIG. 3A, the data connector 140 retrieves the data elements 175A from the first data source 170A, where the data elements 175A include a reference 305 to the second data source 170B.

Diamond 430 may include determining, by a conceptual analysis engine executed by a processor, whether the retrieved content of the first data source is relevant to the search concept. If it is determined at diamond 430 that the retrieved content of the first data source is relevant to the search concept, then the process 400 continues at block 440, which includes indexing the retrieved content of the first data source into a conceptual index. For example, referring to FIG. 3C, in response to the analysis engine 150 indicating that the retrieved data 320 (corresponding to data elements 175A) is relevant to the specified concept, the data connector 140 uses the retrieved data 320 to generate 340 the conceptual index 160A.

Block 450 includes retrieving, via the data connector, content of the second data source based on the reference. For example, referring to FIG. 3C, the data connector 140 establishes a connection 350 to the second data source 170B and obtains the retrieved data 360 (corresponding to all or a portion of the data elements 175B).

However, if it is determined at diamond 430 that the retrieved content of the first data source is not relevant to the search concept, then the process 400 continues at block 460, which includes discarding the retrieved content of the first data source. For example, referring to FIG. 3D, in response to the analysis engine 150 indicating that the retrieved data 360 (corresponding to data elements 175B) is not relevant to the specified concept, the data connector 140 deletes 380 the retrieved data 360. Further, in some examples, the data connector 140 ignores the reference 307 in data elements 175B, and thus does not access the third data source 170C indicated by the reference 307. After block 450 or block 460, the process 400 is completed.

Figure 5:
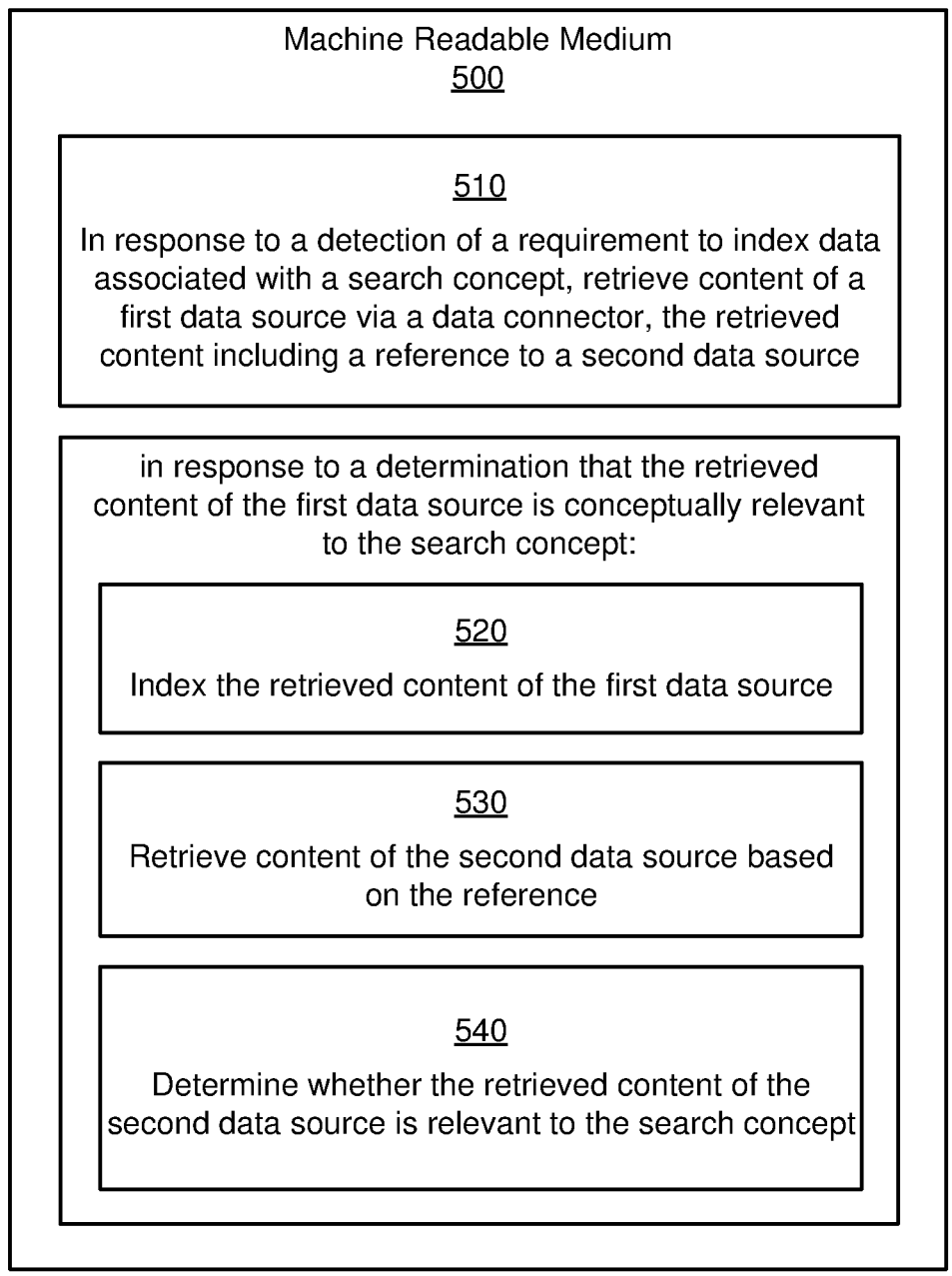
FIG. 5 is a diagram of an example machine-readable medium storing instructions in accordance with some implementations.

Referring now to FIG. 5, shown is a machine-readable medium 500 storing instructions 510-540, in accordance with some implementations. The instructions 510-540 can be executed by any number of processors (e.g., the processor(s) 115 shown in FIG. 1). The machine-readable medium 500 may be a non-transitory storage medium, such as an optical, semiconductor, or magnetic storage medium.

Instruction 510 may be executed to, in response to a detection of a requirement to index data associated with a search concept, retrieve content of a first data source via a data connector, where the retrieved content includes a reference to a second data source.

As shown in FIG. 5, instructions 520-540 may be performed in response to a determination that the retrieved content of the first data source is conceptually relevant to the search concept. Instruction 520 may be executed to index the retrieved content of the first data source. Instruction 530 may be executed to retrieve content of the second data source based on the reference. Instruction 540 may be executed to determine whether the retrieved content of the second data source is relevant to the search concept.

Figure 6:
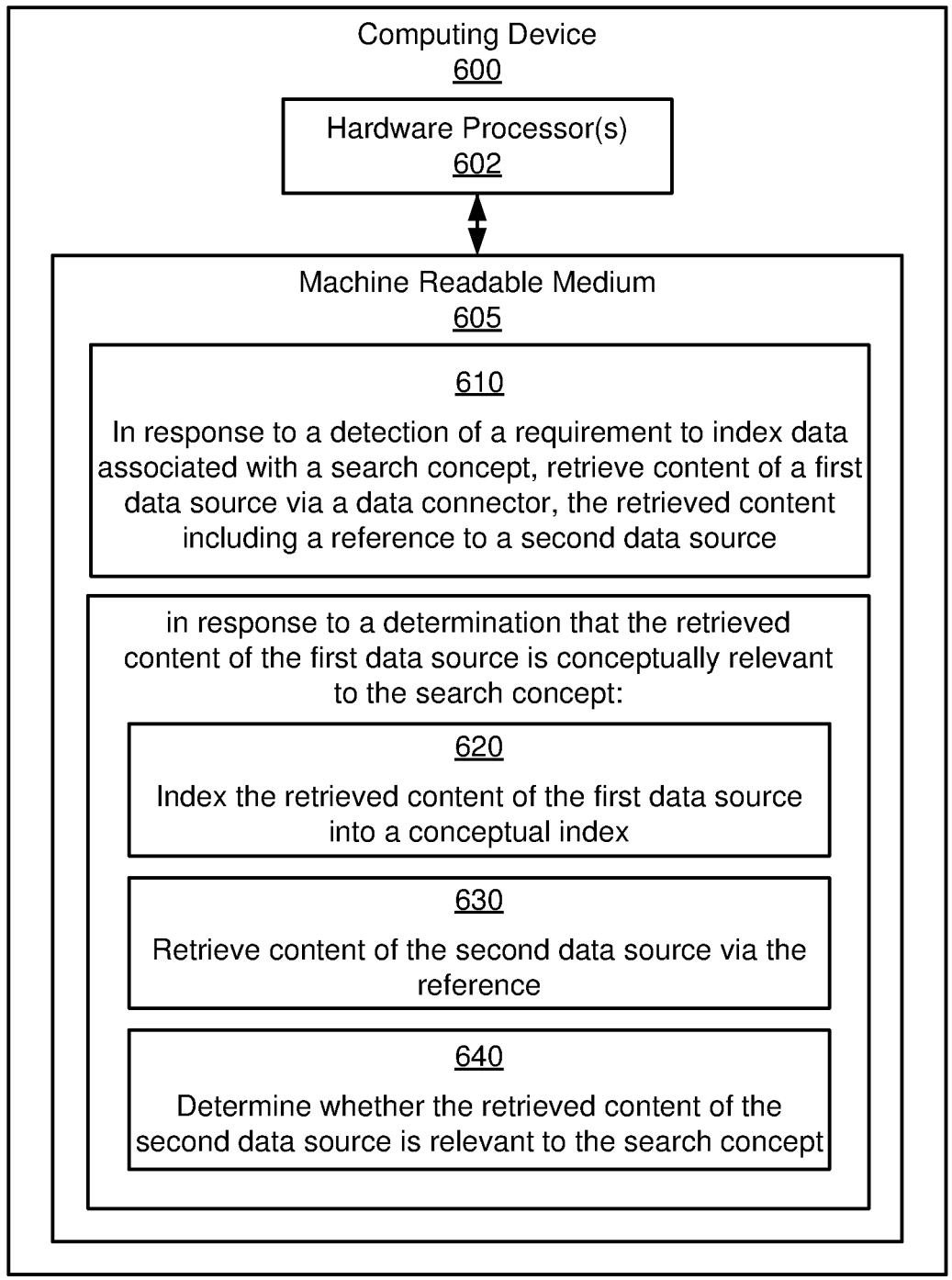
FIG. 6 is a schematic diagram of an example computing device, in accordance with some implementations.

Referring now to FIG. 6, shown is a schematic diagram of an example computing device 600. In some examples, the computing device 600 may correspond generally to the computing device 110 shown in FIG. 1. As shown, the computing device 600 may include hardware processor(s) 602 and machine-readable storage medium 605. The machine-readable storage medium 605 may be a non-transitory medium, and may store instructions 610-640. The instructions 610-640 can be executed by the hardware processor(s) 602.

Instruction 610 may be executed to, in response to a detection of a requirement to index data associated with a search concept, retrieve content of a first data source via a data connector, where the retrieved content includes a reference to a second data source.

As shown in FIG. 6, instructions 620-640 may be performed in response to a determination that the retrieved content of the first data source is conceptually relevant to the search concept. Instruction 620 may be executed to index the retrieved content of the first data source. Instruction 630 may be executed to retrieve content of the second data source based on the reference. Instruction 640 may be executed to determine whether the retrieved content of the second data source is relevant to the search concept.

Figure 7:
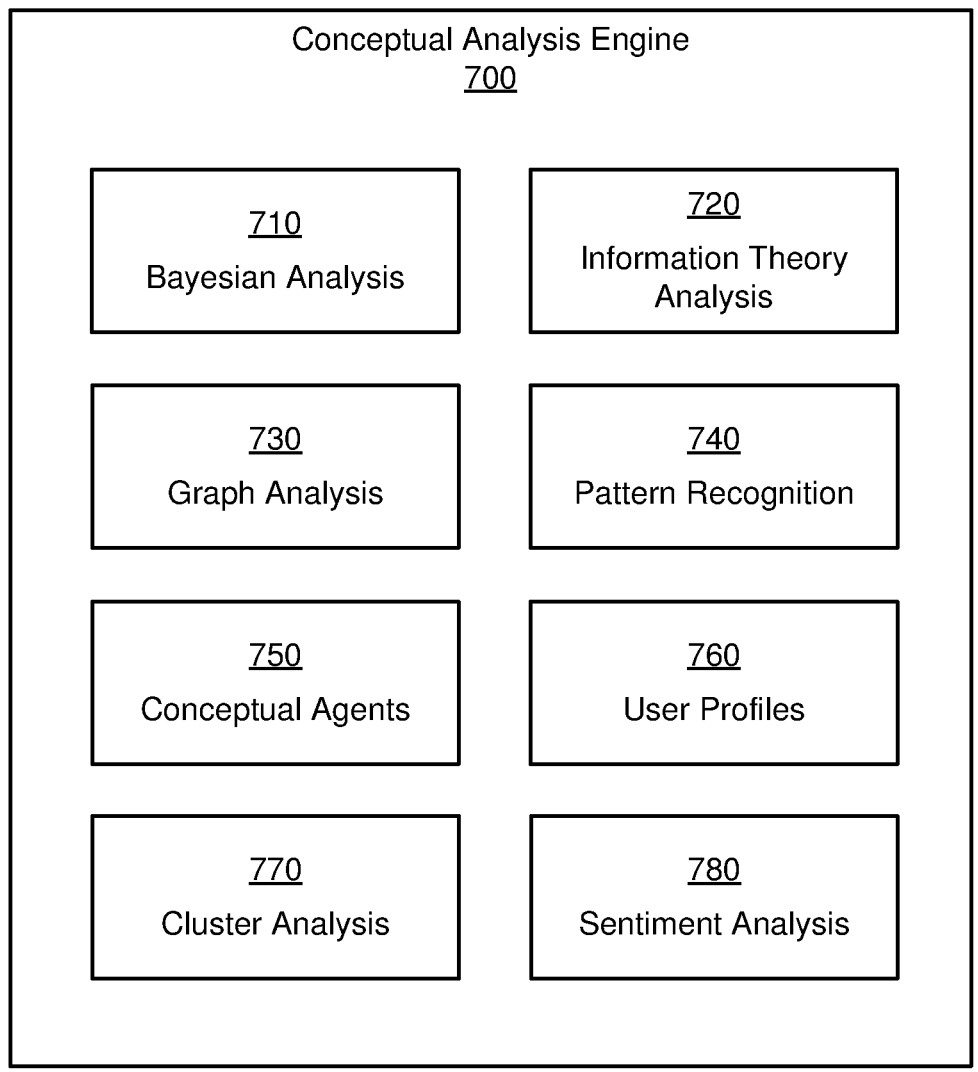
FIG. 7 is a diagram of an example conceptual analysis engine, in accordance with some implementations.

Referring now to FIG. 7, shown is an illustration of an example conceptual analysis engine 700 in accordance with some implementations. The conceptual analysis engine 700 may correspond generally to an example implementation of the analysis engine 150 shown in FIG. 1. Note that conceptual analysis engine 700 shown in FIG. 7 is a non-limiting example, and other implementations are possible As shown, the conceptual analysis engine 700 may include a Bayesian analysis module 710, an information theory analysis module 720, a graph analysis module 730, a pattern recognition module 740, conceptual agents 750, user profiles 760, a cluster analysis module 770, and a sentiment analysis module 780. In some implementations, the conceptual analysis engine 700 may use the modules 710-780 alone or in combination to determine the conceptual meaning of retrieved data, and thereby determine whether the retrieved data is relevant to a specific concept.

In one or more implementations, the Bayesian analysis module 710 may apply Bayesian analysis to a corpus of documents, and thereby generate a language model to determine conceptual meaning of language in that particular corpus. In some examples, the language model may be tailored to a particular discipline, industry, group, organization, and so forth. In some examples, the Bayesian analysis module 710 may use Adaptive Probabilistic Concept Modelling (APCM) to perform back-propagation of the retrieved information.

In some implementations, the information theory analysis module 720 may use Shannon's Theorem to determine conceptual meaning. For example, the information theory analysis module 720 may automatically identify features of interest in the available data, and may extract the highest-value pieces of information. In some examples, the information theory analysis module 720 determine that the less frequently a unit of communication occurs, the more information it conveys.

In one or more implementations, the graph analysis module 730 may generate node graphs from available data, and may determine conceptual meaning using the graph. For example, such node graphs may be used to build recommendation systems that link customers and products based on similarities in customers' purchasing history, or to identify friendship groups by spotting cliques of users in a social network with a higher volume of communication between them. Further, the node graphs may be used to identify hidden relationships by looking for paths between nodes that are not directly connected to each other. Shortest path algorithms find an optimal route between two nodes based on chosen criteria.

In some implementations, the pattern recognition module 740 may determine conceptual meaning based on recognizing patterns in any type and combination of source data. For example, the pattern recognition module 740 may perform text pattern recognition, image pattern recognition, audio pattern recognition, speech-to-text conversion, phonetic phrase searches, optical character recognition (OCR), barcode recognition, human image processing, face and gesture recognition, object recognition, three-dimensional spatial recognition, change detection, and so forth In one or more implementations, the conceptual agents 750 may be software agents that encapsulate a concept or topic. The conceptual agents 750 may be generated from any number of pieces of unstructured text or content. Further, the conceptual agents 750 may be stored as a set of terms and associated weights, where both the terms and weights have been selected to best represent the concept in its future usage. This selection may include using a number of pieces of information, including the number of occurrences and the proximity of certain sets of terms, as well as a language model that indicates which terms contain the most information or entropy.

In some implementations, the user profiles 760 may be generated for each user. Each user profile 760 may indicate a user's interests and may be generated from the documents that the user creates, edits, or views. The user profiles 760 may be used to interpret the conceptual meaning of ambiguous terms. Further, the user profiles 760 may be used to determine conceptual meaning for a community of users that share similar profiles.

In one or more implementations, the cluster analysis module 770 may determine conceptual meaning based on generated clusters. For example, the cluster analysis module 770 may analyze a corpus of data elements to group it into similar cluster of elements, and may analyze each cluster with a corresponding conceptual agent 750.

In some implementations, the sentiment analysis module 780 may determine conceptual meaning based on underlying sentiment in data elements. For example, the sentiment analysis module 780 may identify data that indicates an opinion (e.g., a restaurant review), and may use linguistic and statistical methods to determine the underlying sentiment (e.g., positive or negative).

In accordance with some implementations, examples are provided for directed collection and indexing of data based on conceptual relevance. Some implementations include analyzing data from a first data source to determine its relevance to a specific concept. If the collected data is determined to not be relevant to the concept, the collected data may be discarded, and any reference to a different data source will be ignored. However, if the collected data is determined to be relevant to the concept, the collected data is used to generate and/or update a conceptual index, and any reference included in the collected data may be used to access a different data source. This process may then be repeated for any number of data sources. In this manner, the collection and indexing of data may be dynamically directed based on the conceptual relevance of the collected data. Accordingly, some examples may reduce bandwidth, time, and/or storage requirements to establish the data repository. Further, some examples may improve the relevance and/or usefulness of the data indexed for conceptual searches.

Note that, while FIGS. 1-7 show various examples, other implementations are contemplated. For example, referring to FIG. 1, it is contemplated that the system 100 may include any number of devices or systems, and each device may include additional components than those shown in FIG. 1. In another example, it is contemplated that the conceptual index 200 shown in FIG. 2 may use any data format, structure, or content. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a processor to:
　in response to initiation of a data indexing for a search concept, retrieve content of a first data source via a data connector, the retrieved content including a reference to a second data source;
　in response to a determination that the retrieved content of the first data source is relevant to the search concept:
　　generate, via the data connector, a conceptual index data structure based on the retrieved content of the first data source, wherein the instructions that upon execution cause the processor to generate the conceptual index data structure further cause the processor to index the retrieved content of the first data source in the conceptual index data structure based on conceptual relevance of the retrieved content to the search concept;
　　retrieve content of the second data source based on the reference and the conceptual index data structure;
　　determine whether the retrieved content of the second data source is relevant to the search concept; and
　　modify the conceptual index data structure based on the retrieved content of the second data source, in response to whether the retrieved content of the second data source is determined to be relevant to the search concept.

2. The non-transitory machine-readable storage medium of claim 1, wherein the instructions upon execution further cause the processor to:
in response to a determination that the retrieved content of the first data source is not relevant to the search concept:
discard the retrieved content of the first data source; and
ignore the content of the second data source.

3. The non-transitory machine-readable storage medium of claim 2, wherein the instructions upon execution further cause the processor to:
subsequent to the determination that the retrieved content of the first data source is not relevant to the search concept, retrieve content of a third data source that is not referenced in the first and second data sources.

4. The non-transitory machine-readable storage medium of claim 1, wherein the instructions upon execution further cause the processor to:
in response to the determination that the retrieved content of the second data source is relevant to the search concept:
index the retrieved content of the second data source in the conceptual index data structure based on conceptual relevance of the retrieved content of the second data source to the search concept; and
retrieve content of a third data source based on a second reference included in the retrieved content of the second data source.

5. The non-transitory machine-readable storage medium of claim 1, wherein the instructions upon execution further cause the processor to:
in response to a user query associated with the search concept, generate query results based on the conceptual index data structure; and
present the query results to a user, wherein the query results comprise at least a portion of the retrieved content of the first data source, at least a portion of the retrieved content of the second data source, or both.

6. The non-transitory machine-readable storage medium of claim 1, wherein the first data source is a first web site, the second data source is a second web site, and the reference is a hyperlink to the second website.

7. The non-transitory machine-readable storage medium of claim 1, wherein the retrieved content of the first data source comprises image content, and the reference comprises a visual identifier.

8. The non-transitory machine-readable storage medium of claim 1, wherein the retrieved content of the first data source comprises audio content, and the reference comprises human speech identifying a data source.

9. A computer implemented method comprising:
detecting initiation of a data indexing for a search concept;
in response to the detection of the initiation of the data indexing, retrieving, via a data connector, content of a first data source, the retrieved content including a reference to a second data source;
determining, by a conceptual analysis engine executed by a processor, whether the retrieved content of the first data source is relevant to the search concept;
in response to the determination that the retrieved content of the first data source is relevant to the search concept:
generating, by the data connector, a conceptual index data structure based on the retrieved content of the first data source, wherein generating the conceptual index data structure comprises indexing the retrieved content of the first data source in the conceptual index data structure based on conceptual relevance of the retrieved content to the search concept;
retrieving, via the data connector, content of the second data source based on the reference and the conceptual index data structure;
determining, by the conceptual analysis engine, whether the retrieved content of the second data source is relevant to the search concept; and
modifying, by the data connector, the conceptual index data structure based on the retrieved content of the second data source, in response to the determination of whether the retrieved content of the second data source is relevant to the search concept.

10. The computer implemented method of claim 9, further comprising:
in response to a determination that the retrieved content of the second data source is not relevant to the search concept:
discarding the retrieved content of the second data source; and
ignoring a second reference included in the retrieved content of the second data source, the second reference identifying a third data source.

11. The computer implemented method of claim 9, further comprising:
in response to a determination that the retrieved content of the second data source is relevant to the search concept:
indexing the retrieved content of the second data source in the conceptual index data structure based on conceptual relevance of the retrieved content of the second data source to the search concept; and
retrieving, via the data connector, content of a third data source based on a second reference included in the retrieved content of the second data source.

12. The computer implemented method of claim 9, wherein the determining whether the retrieved content of the first data source is relevant to the search concept occurs after the retrieving the content of the first data source.

13. The computer implemented method of claim 9, wherein the reference comprises a network address.

14. The method of claim 9, further comprising:
in response to a user query associated with the search concept, generating query results based on the conceptual index data structure; and
presenting the query results to a user via a user interface, wherein the query results comprise at least a portion of the retrieved content of the first data source, at least a portion of the retrieved content of the second data source, or both.

15. A computing device comprising:
a hardware processor; and
a machine-readable storage medium storing instructions, the instructions executable by the hardware processor to:
in response to initiation of a data indexing for a search concept, retrieve content of a first data source via a data connector, the retrieved content including a reference to a second data source;

in response to a determination that the retrieved content of the first data source is relevant to the search concept:
    generate, via the data connector, a conceptual index data structure based on the retrieved content of the first data source, wherein the instructions executable by the hardware processor to generate the conceptual index data structure further cause the hardware processor to index the retrieved content of the first data source into a conceptual index in the conceptual index data structure based on conceptual relevance of the retrieved content to the search concept;
    retrieve content of the second data source via the reference and the conceptual index data structure;
    determine whether the retrieved content of the second data source is relevant to the search concept; and
    modify the conceptual index data structure based on the retrieved content of the second data source, in response to whether the retrieved content of the second data source is determined to be relevant to the search concept.

16. The computing device of claim 15, the instructions executable by the hardware processor to:
    in response to a determination that the retrieved content of the first data source is not relevant to the search concept:
        discard the retrieved content of the first data source; and
        not retrieve the content of the second data source,
        wherein the determination that the retrieved content of the first data source is not relevant to the search concept occurs after retrieving the content of the first data source.

17. The computing device of claim 16, the instructions executable by the hardware processor to:
    in response to the determination that the retrieved content of the second data source is relevant to the search concept:
        index the retrieved content of the second data source in the conceptual index data structure based on conceptual relevance of the retrieved content of the second data source to the search concept; and
        retrieve content of a third data source via a second reference included in the retrieved content of the second data source.

18. The computing device of claim 15, wherein the retrieved content of the first data source is indexed via the data connector, and wherein the content of the second data source is retrieved via the data connector.

19. The computing device of claim 15, wherein the reference is a uniform resource locator (URL) associated with the second data source.

20. The computing device of claim 15, wherein the reference is a video image of a location of the second data source.

* * * * *